Sept. 20, 1960 R. J. SLUTZ 2,953,774

MAGNETIC CORE MEMORY HAVING MAGNETIC CORE SELECTION GATES

Filed Aug. 13, 1954 2 Sheets-Sheet 1

INVENTOR

Ralph J. Slutz

BY Arthur Vinograd

ATTORNEY

Fig. 4-A

CHARACTERISTICS OF A MAGNETIC CORE STORAGE UNIT

INVENTOR
Ralph J. Slutz
BY Arthur Vinograd
ATTORNEY

United States Patent Office 2,953,774
Patented Sept. 20, 1960

2,953,774

MAGNETIC CORE MEMORY HAVING MAGNETIC CORE SELECTION GATES

Ralph J. Slutz, Boulder, Colo., assignor to the United States of America as represented by the Secretary of Commerce Filed Aug. 13, 1954, Ser. No. 449,805

1 Claim. (Cl. 340—174)

This invention relates to a magnetic core memory device such as is employed for the storage of digital information and particularly to an improved matrix arrangement whereby access to a selected storage cell can be accurately obtained.

Magnetic core storage devices currently employed make use of the characteristics of permanent magnetic materials wherein the magnetic polarization remains after the removal of the external polarizing force. Such material can be made to "remember" information because, if it is polarized into one of at least two residual magnetic states and the polarizing force is then removed, the material will remain in such magnetized state and the subsequent application of an interrogatory pulse of magnetization can sense the previous condition of polarization of the material.

Generally, any magnetic circuit can be employed for such process, provided that at least two different remanent states of polarization can be induced consequent to the application of two distinct polarizing forces. The problem of storing information therefore is not nearly as critical as that of providing an accurate means of access in a matrix involving a large number of such core elements so that a particular unit can be selected and "read" without disturbing the other units in the array. For reasons that will subsequently be explained, a fairly accurate degree of access may be obtained in existing matrix systems because of the development and use of special core materials such as Deltamax, Orthonik or a 4–79 Molybdenum-Permalloy or a rectangular hysteresis-loop ferrite such as MF 1118. Such materials are, however, rather costly and it is therefore one object of the present invention to provide a magnetic core memory matrix in which accurate access may be obtained by employing ordinary and less costly magnetic materials for the core elements.

A principal object of this invention is to provide a magnetic core memory matrix in which storage cores are controlled by magnetic gate cores in a manner which greatly reduces the weaknesses present in conventional magnetic storage systems.

A further object of this invention is to provide a storage system in which the operating parameters are not critical and which is therefore not sensitive to the unwanted effects of interfering signals.

A still further object of this invention is to provide a storage system having circuit characteristics that will permit operation at higher speeds than is normally employed.

Figure 1:
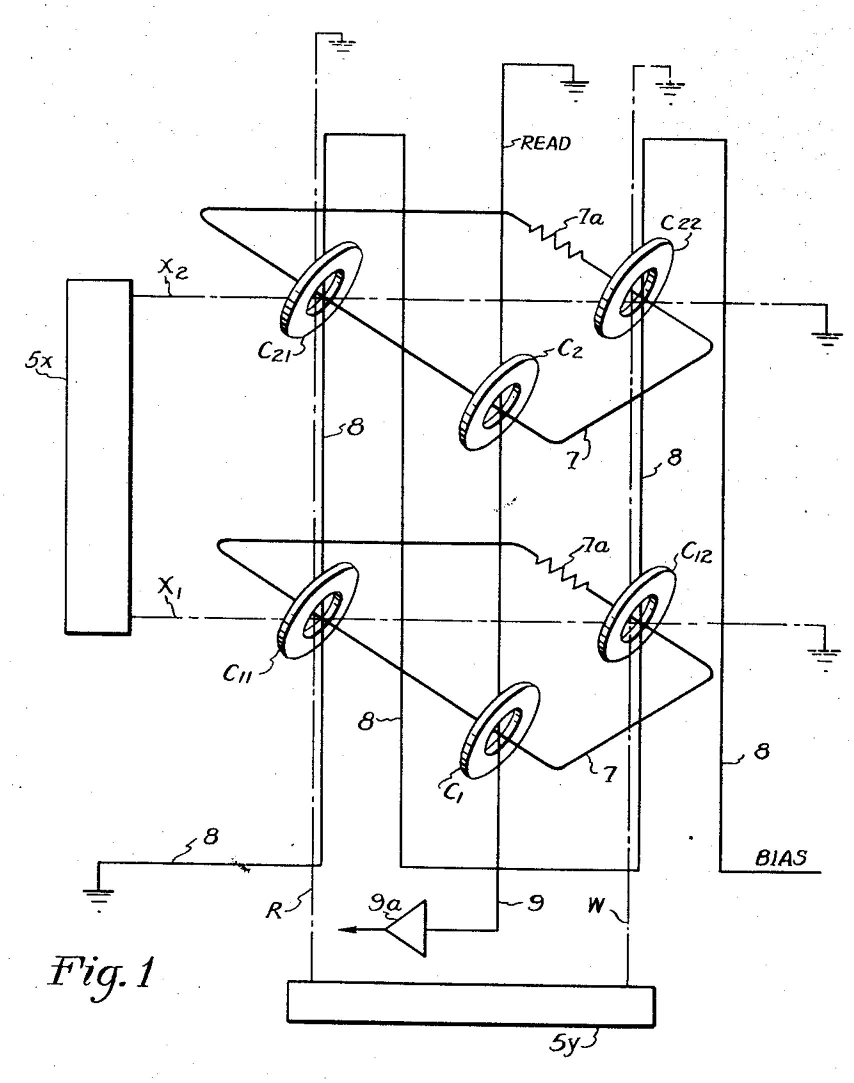
Fig. 1 shows in schematic form a preferred embodiment of the present invention.
Figure 5:
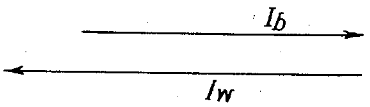
Figure 6:
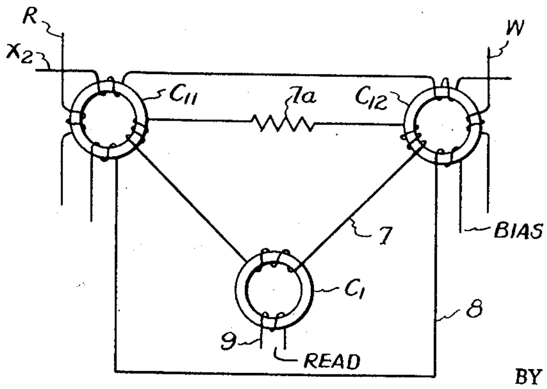

Fig. 4*a* is a hysteresis loop of another type of conventional core material which may be employed as the storage cores according to this invention;

Fig. 5 is a vector representation of the relative magnitudes of certain of the magnetizing currents employed in the present construction and Fig. 6 is a detail of Fig. 1 showing the arrangement of core windings.

Figure 2:
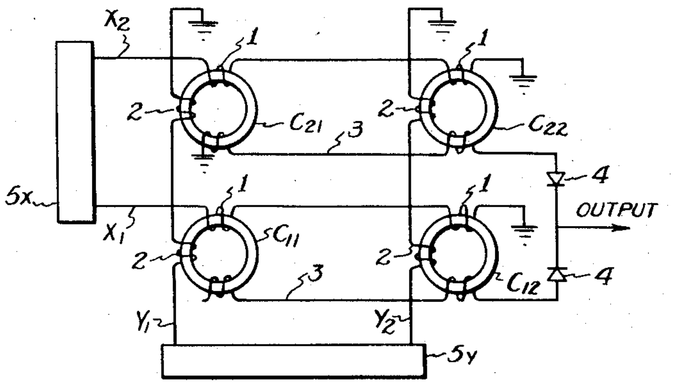
Fig. 2 shows a portion of a magnetic core matrix of conventional form.
Figure 3:
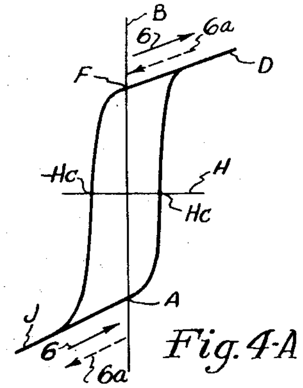
Fig. 3 represents a hysteresis diagram showing the magnetic characteristics of one type of specialized material employed as an information storing device according to existing storage systems.
Figure 3:
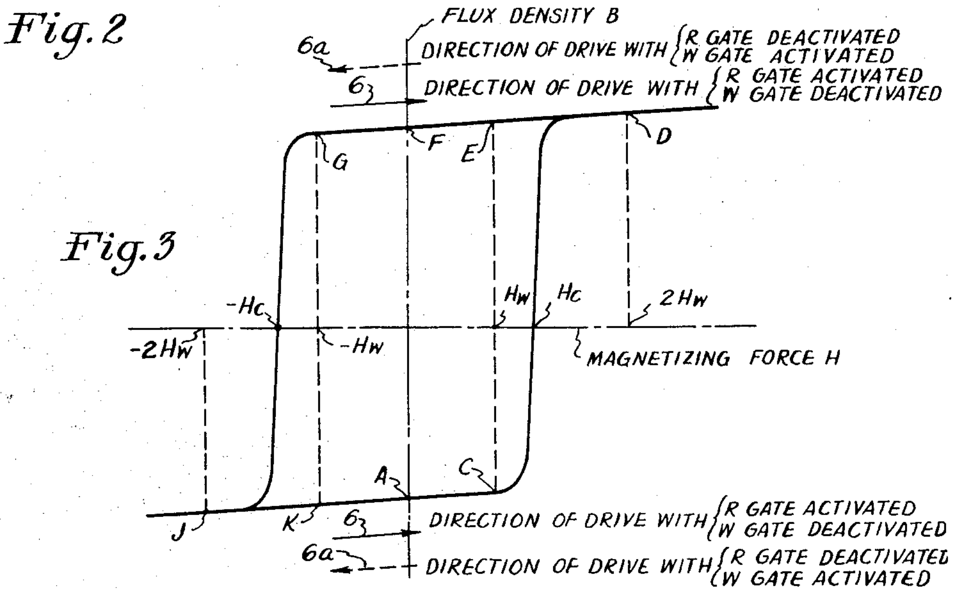

In order that a clear understanding may be had of the improved memory device comprising the present invention the construction and operation of existing types of magnetic core information storing matrices should be briefly considered. Figs. 2 and 3 illustrate certain principles involved.

A typical magnetic core matrix is shown in Fig. 2 as comprising a plurality of cores $C_{11}$, $C_{12}$, $C_{21}$, and $C_{22}$. The cores are generally symmetrically arranged so as to form horizontal "rows" generally designated as $X_1$, $X_2$, etc. and vertical columns $Y_1$, $Y_2$, etc. Respective horizontal rows are electrically interconnected by respective conductors $X_1$, $X_2$, etc. each lead having windings 1 coupled to the cores in each row. Similarly the cores comprising a vertical column are independently interconnected by conductors $Y_1$, $Y_2$, having coupling windings 2 as shown. In addition a conductor 3 common to all cores may be employed to sense the state of the cores and, as shown, may be connected through suitable rectifiers 4—4 to a common output. As is well known, the number of cores comprising a particular matrix is optional. While only four cores have been illustrated in Fig. 2, as many additional rows and columns may be provided as desired, it being understood that a like number of additional X and Y windings arranged according to the symmetrical pattern shown, are provided.

In actual practice, the conductors X or Y may comprise only a single turn which is threaded through the center of each core as shown in Fig. 1, which symbolizes a two-dimensional array of core elements formed by straight intersecting conductors, the core being placed around the intersection and lying in a plane which is angularly related with respect to each conductor.

The operation of the two-dimensional array shown in Fig. 2 is well known in the art and is best understood by reference to the hysteresis loop represented in Fig. 3. It is important to note, however, that existing matrices must necessarily employ core material of exacting specifications and which possess hysteresis characteristics closely approaching that of the curve shown in Fig. 3, which is substantially rectangular in shape. As will later appear, the use of ordinary core materials having conventional hysteresis loops (see Figs. 4, 4*a*) are not practicable in existing matrices because of the generation of spurious signals and consequent lack of reliability.

Fig. 3 shows a typical hysteresis loop characterising presently employed core material made of one of the identified rectangular hysteresis-loop alloy materials. The preliminary application of magnetizing current to a suitable coil placed around a core of such material will produce a magnetizing force $H_w$ in the core, which will thereby assume either one of two "conditions" depending on the direction of the current applied. That is, the application of a positive magnetizing current will magnetize the core so that it will be in a state represented by "condition" F on the hysteresis loop of Fig. 3, while the application of a negative current will magnetize the core to "condition" A on the loop. The subsequent removal of the magnetizing currents does not affect these conditions. It may be observed that such magnetic states are singularly adaptable for the representation of information according to the binary system of numerical notation since the points F and A on the hysteresis loops represent discrete stable conditions of magnetization corresponding respectively to the 1—0 representation of numbers in the binary system. In other words, the true conditions F and A correspond to a stored "bit" in the binary system. The point F on the hysteresis loop may be identified as the point of positive residual magnetization while point A corresponds to a state of negative residual magnetization. The points D and J appearing on the curve represent positions of positive and negative magnetic saturations respectively.

The characteristic behavior of magnetic material is such that the application of a magnetizing force H that tends to drive the core from a point of residual magnetization to a point of magnetic saturation of the same polarity (i.e. F to D or A to J respectively) cannot cause a change in the magnetic state or condition of the core and the resultant flux change will produce only a very small output signal. Such small output signals can, however, manifest themselves in the output coil of the core and unless the parameters of the circuit are critically controlled, misleading results may be obtained. On the other hand if the magnetizing force tends to drive the core from a point of residual magnetization to a point of magnetic saturation of opposite polarity, i.e. through the path A—C—D, for example, then a change in magnetic state occurs and the resultant flux change is sufficient to produce a large and significant output signal. Moreover, it can be assumed that when an excitation current of positive polarity is applied to the magnetizing windings on the cores, the magnetizing forme $H_W$ will tend to drive the cores in the direction indicated by the solid arrows 6—6 shown on the hysteresis loop, namely counter clockwise from the negative residual magnetization point A and clockwise relative to the positive residual magnetization point F. Similarly a reversal of the applied excitation current will change the direction of such driving force to that indicated by the dotted arrows *6a*—*6a* with respect to each residual point.

The characteristics of the core material represented by the hysteresis loop of Fig. 3 therefore are such that the application of a pulse of current $I_W$ (see Fig. 5) to produce a magnetizing force of $H_W$ when the core is initially in condition A, will drive the core to state C as represented on the hysteresis loop. Because of the rectangular nature of the curve, however, upon removal of such magnetizing force, the core will revert to state A, or to be more exact, to a state close to A because the force of magnetization $H_W$ is insufficient to drive the core beyond the "knee" C of the hysteresis loop. Similarly, if the core had previously been magnetized to condition F, and a pulse $I_W$ is subsequently applied to produce a like magnetizing force $H_W$, the core will be forced to a state corresponding to point E on the curve and will revert to state F upon removal of the current. In other words, the application to the core of a current less than that corresponding to a magnetizing force of $H_c$ in Fig. 3 will not produce a permanent change of state or condition; that is, a change from A to F or vice-versa.

Assuming the same conditions of mgnetization of the core, that is with the core being in either of the conditions represented by points A or F, the application of a current pulse of magnitude $2I_W$ (Fig. 5) sufficient to produce a magnetizing force of $2H_W$ will be effective to produce a change in the state or condition of the core, the resulting flux change enabling a large signal output. If the core were originally at point A on the curve, the application of such magnetizing current will force the core counter clockwise in the direction of arrow 6 along the hysteresis loop to state D, and, upon removal of the current pulse it will now assume condition F, instead of reverting to state A. On the other hand, if the core were initially magnetized to condition F, the application of a magnetizing force $2H_W$ would only have the effect of forcing the core clockwise in the direction of arrow 6 along the hysteresis loop to state D and upon removal of the magnetizing force, the core would revert to conditon F. It may be observed at this point that if the direction of current flow in the magnetizing coil were reversed then the core would be driven clockwise from state A and counter clockwise from state F as indicated by the dotted arrows *6a*—*6a*.

It is evident from the above considerations that, because of the rectangular configuration of the hysteresis loops characterising core elements made of the referred to materials and the presence of the relatively sharp "knees" or bends in the curve consequent thereto, the core can discriminate between current pulses corresponding to the magnetizing forces $H_W$ and $2H_W$ respectively, and that a change of state or condition can be manifested as a result of such discrimination. These features are employed in existing matrix constructions in order to obtain access to a particular core or cores in a matrix in a manner now to be explained.

By utilizing the above features it can now easily be shown how access can be obtained to any one selected core in a multiple core matrix of the type shown in Fig. 2. By using suitable switching means 5X, 5Y connected to the X and Y leads respectively, current pulses of magnitude $I_W$ sufficient to produce a magnetizing force of $H_W$ can selectively be applied to any desired conductor comprising the rows X and columns Y. A suitable switch for this purpose has been described by Jan A. Rajchman in the R.C.A. Review, vol. 13, No. 2, June 1952, on page 188 in article entitled "Static Magnetic Memory and Switching Circuits." By symmetry, it follows that the application of current pulses of magnitude $I_W$ to one or all of the row conductors X can only create a magnetizing force $H_W$ in each core, which, according to Fig. 3, cannot produce a state change in the cores. Similarly the application of a current pulse $I_W$ only to the column conductors Y will also not be sufficient to produce a change in state or condition of the core. Since, however, each of the cores are coupled to a row-column pair of conductors, it follows that the application of a current pulse $I_W$ to both a selected row and column conductor respectively, will, because of the circuit symmetry, cause only that core lying at the intersection of an energized row-column pair to be affected by the sum of the currents in each conductor or, in other words, by a current pulse having a magnitude $2I_W$. Since a current pulse of such magnitude produces a magnetizing force of $2H_W$, it is apparent that if cores are employed in the matrix having hysteresis characteristics such as shown in Fig. 3, a change of state or condition will occur from, for example, state A to state F in the manner previously described. In Fig. 2, for example, if current pulses of magnitude $I_W$ are applied to row $X_1$, and column $Y_2$, only core $C_{12}$ will suffer a change in state, since cores $C_{11}$ and $C_{22}$ are obviously subjected to current pulses of magnitude $I_W$ only while core $C_{21}$ is completely isolated from the effects of the applied current. It follows that to select any desired core according to the arrangement of Fig. 2, the following conditions obtain:

| Core selected: | Selecting lines energized |
|---|---|
| $C_{11}$ | $X_1Y_1$ |
| $C_{12}$ | $X_1Y_2$ |
| $C_{21}$ | $X_2Y_1$ |
| $C_{22}$ | $X_2Y_2$ |

It is emphasized that the above characteristic operation of the matrix can be obtained only by employing special core materials having a substantially rectangular hysteresis loop for reasons already explained. Cores made out of a more conventional material having a hysteresis loop like that shown in Fig. 4 would not be able to discriminate between magnetizing forces corresponding to H and 2H respectively and the application of the former magnetizing force alone to such material could produce an unwanted change in state. Therefore the above described system for obtaining access to a desired core would not be feasible nor sufficiently accurate if ordinary magnetic core material were employed.

It is a paramount object of the present invention however to preserve the features permitting ready access to the magnetic core memory matrix and yet employ core material which does not require the critical characteristics of the special type of core material presently employed.

Such objective is achieved by an arrangement of core elements in which magnetic cores are employed separately for the storage of information and as gates to drive the storage cores in a manner which reduces the weaknesses present in conventional magnetic storage systems.

Fig. 1 shows a portion of a typical matrix employing the features of this invention and Fig. 6 shows in detail the manner in which the various windings may be coupled to the cores. In Fig. 1, the two center core members $C_1$ and $C_2$ represent storage cores while the cores $C_{11}$, $C_{12}$, $C_{21}$, and $C_{22}$ are employed as gating cores. The windings $X_1$ and $X_2$ represent the "row" lines while the "column" or Y lines in this instance are designated R (read) and W (write) respectively. The row and column conductors are represented in Fig. 1 by broken lines for clarity and are further illustrated as being coupled to each of the cores by a single threaded turn for simplicity.

A separate sensing conductor 9 is shown threaded through each of the storage cores $C_1$, $C_2$, while an additional bias winding 8 is shown coupled to each of the gate cores $C_{11}$, $C_{12}$, $C_{21}$, and $C_{22}$. It will be further noted that each "row" of gate cores, for example, $C_{11}$ and $C_{12}$ forms a grouping or cluster with a respective storage core such as $C_1$ as is detailed in Fig. 6. The gates $C_{21}$, $C_{22}$ are similarly grouped with respect to core $C_2$. Each of such groups are inductively interconnected by a respective loop designated in Fig. 1 as 7—7 which loop may include an impedance element *7a*.

Figure 4:
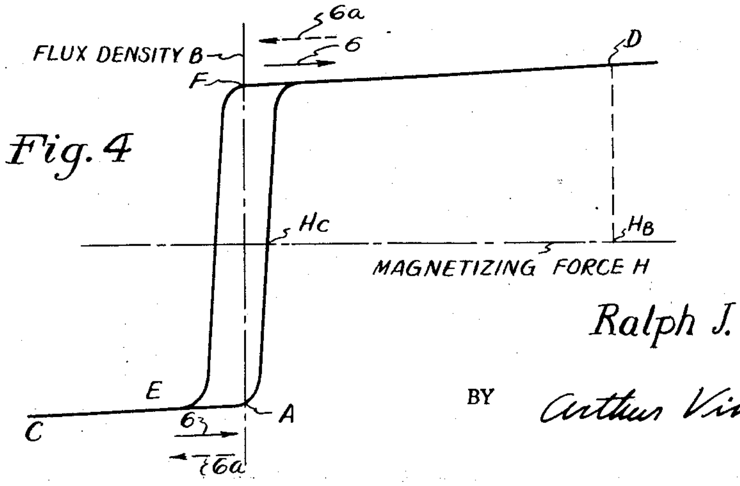
Fig. 4 is a hysteresis signature of a more conventional type of magnetic material such as may be employed for the gate cores according to the present invention.

Fig. 4 shows the hysteresis diagram of the type of core material employed in connection with the gate cores of the matrix shown in Fig. 1. It will be noted that the core material employed for the gate elements exhibits conventional hysteresis characteristics since the curve is not rectangular and does not include sharp, well defined "knees" as in the case of the material represented by the Fig. 3 diagram. The hysteresis loop shown in Fig. 4 in other words is similar to that characterizing more conventional magnetic material, the only requirement being that it exhibit sharp saturation characteristics as evidenced by the lines C and D in Fig. 4.

Fig. 5 shows vectors representing respectively the relative magnitudes and directions of magnetizing currents $I_b$ and $I_w$ employed with the core selecting system shown in Fig. 1. The current $I_b$ is a constant bias current which is applied to the bias winding 8 shown in Fig. 1 and is of a magnitude which, in the absence of any other currents would be adequate to drive the core in the direction indicated by the arrow from the state A to state D on the hysteresis loop shown in Fig. 4. In other words it is sufficiently large to produce a magnetizing force corresponding to $H_c$ in Fig. 4. The current $I_w$ in the circuit of Fig. 1 is applied to each of the row and column conductors $X_1$, $X_2$, R and W to maintain them in a passive magnetic state. That is, such current is continuously applied and is of greater magnitude than $I_b$ and of opposite sense. Thus, with bias current $I_b$ energizing each of the gate cores $C_{11}$, $C_{12}$, $C_{21}$, and $C_{22}$, the effect of the oppositely applied quiescent state current $I_w$ applied to both the horizontal and vertical windings on the gate cores will be to create a resultant magnetizing force of a magnitude proportional to the difference, $2I_w-I_b$ which is greater in magnitude than $I_b$ and of opposite sense. As was the case in the analysis of the Fig. 3 diagram, such magnetizing force will not cause a state change in the core, since it is chosen of such polarity as to tend to drive the core from its negative residual magnetic state A toward the point of negative saturation C as indicated by the broken line arrow in Fig. 4 and these cores will therefore remain at the lower or negative magnetic state A.

To activate a particular gate, it is only necessary to stop the currents in one row winding, and one column winding, ($X_1$ and W for example) by means of the previously identified switches. For reasons similar to those discussed in connection with Fig. 2 only the gate core $C_{12}$ will be selected or activated since such core is now affected by the $I_b$ current alone. Core $C_{11}$ and $C_{22}$ for example will be subject to a virtually zero magnetizing force $(I_w-I_b)$, while $C_{21}$ will remain unaffected.

The one core $C_{12}$ at position $X_1$ W now is influenced only by the current $I_b$, which as previously explained is sufficient to force the core in the direction of the solid arrow as shown in Fig. 4 from state A to state D. The large change in flux density consequent to such magnetic state change enables the production of a large output signal which will be manifested in a suitable pick up coil such as the output line 9 shown in Figs. 1 and 6. From the above considerations, it is apparent that reinstatement of the currents $I_w$ in each of the conductors $X_1$ and W will now force the core $C_{12}$ back to state C in the direction of the dotted arrow *6a* (Fig. 4) since the magnetizing currents $I_w$ applied to both the horizontal and vertical windings on the core is greater in magnitude and of opposite sense than that due to $I_b$ alone.

The system so far described avoids many of the weaknesses of the conventional magnetic core matrix previously described in connection with Fig. 2. No close tolerances are required for either the magnetic gate units or the driving currents. The coercive force of the magnetic units can vary widely, as can the driving currents, provided (1) the bias current $I_b$ always exceeds the greatest coercive force of any core unit and (2) the current $I_w$ is of a magnitude greater than that of bias current $I_b$. Each of the driving currents $I_w$ for the various rows and columns could, in fact, be of different magnitudes with respect to the other since as long as the current of least magnitude is larger than $I_b$ it will be adequate to prevent $I_b$ from driving a core into its upper state.

Moreover, the speed of operation may be improved by making the magnetizing force produced by $I_b$ large as compared to $H_c$ (Fig. 4). Such feature is obtained by virtue of the fact that $I_b$ can arbitrarily be made as large as desired, providing the magnitude of $I_w$ is still larger.

A characteristic feature of the gate arrangement described is that over a complete cycle of operation, the output of each gate core is bipolar. That is, when the appropriate driving currents $I_w$ are stopped, the core thereby selected is forced to a magnetic state corresponding to point D in the loop diagram of Fig. 4. An output signal of (assumed) positive polarity is thereby obtained. When the driving currents $I_w$ are restored, such selected core is driven to magnetic state C and an output signal of opposite polarity is obtained. Since the resultant change of flux is proportional to the integral of voltage with respect to time, these two pulses have equal voltage integrals while the amplitudes of such pulses may be either equal or unequal, as determined by the rate at which the operations are performed.

In Fig. 1 output windings are provided individually to each of the gate cores $C_{11}$, $C_{12}$, $C_{21}$, and $C_{22}$. Thus, small unwanted output signals do not accumulate as in the case of a serially connected output winding as in Fig. 2. The accumulation of these spurious signals sufficient to override the desired output is thus avoided.

The magnetic core memory matrix shown in Fig. 1 combines an individual storage core such as $C_1$ or $C_2$ with a plurality of gate drivers $C_{11}$, $C_{12}$, or $C_{21}$, $C_{22}$. The characteristics of the storage cores are used only for storage and not for selection purposes as obtains in the prior art system of Fig. 2. Access is obtained by the magnetic gate system, which, as above described is operated in a non-critical manner and therefore avoids the weaknesses inherent in a conventional magnetic core matrix.

Each storage core such as $C_1$ is driven by a winding or loop 7 which links it with the output obtained from a plurality of respective magnetic gate cores such as $C_{11}$ and $C_{12}$ associated with such storage core. The outputs of the gate cores $C_{11}$, $C_{12}$, $C_{21}$, and $C_{22}$ respectively, are so connected by virtue of the loops 7—7 as to produce opposite effects on the respective associated storage core $C_1$ or $C_2$.

The overall operation of the matrix shown in Fig. 1 is such that a storage core $C_1$ or $C_2$ can be written to either one of two states or conditions of residual magnetization by operating a proper one of the gate cores: one of the R gates to leave it at condition A, Fig. 4, or one of the W gate cores to leave the storage core at condition F. Such results are obtained because of the following outlined characteristic behavior of magnetic cores when subjected to a magnetizing force.

Referring to the hysteresis loop for the type of material employed as the storage core in accordance with this invention as illustrated in Fig. 4*a*, and assuming as previously set forth that the loop 7 (Fig. 1) which is the magnetization winding for the storage core is such that a magnetizing current through the winding is of an assumed direction so as to drive the core from state A in a counter clockwise direction and from state F in a clockwise direction as indicated by the solid directional arrows 6—6 in the diagram and, conversely that a reversal of such current will drive the core clockwise from magnetic state A and counter clockwise from state F as indicated by the broken line directional arrows 6*a*—6*a*, then the following premises may be drawn governing the behavior of the magnetic circuit. The hysteresis loop of Fig. 4*a* should be read with the same arrow legendry shown in Fig. 3.

*Effect of the R gates*

When a storage core is initially at state A, the effect of the initial magnetizing current supplied by an R gate through loop 7 will be to apply a magnetizing force that will drive the core (Fig. 4*a*) counter clockwise in the direction indicated by solid arrow 6 through the path A—D. Such action will occur when one of the R gates is selected and activated by suitable deenergization of a selected pair of the X and R leads as already described and produces an output signal which gives rise to the above magnetizing current in the storage core. Subsequent deactivation of the R gate core results in the transmittal of a signal that produces a magnetic current of opposite sense in the storage core which is then driven from its previous state F in a counter clockwise direction as indicated by arrow 6*a*, through the path F—J—A.

Similarly, if the storage core were initially in magnetic state F, activation of an R gate, will set up a magnetizing current that will drive the storage core, clockwise from F to D and the core will then revert to condition F. Upon deactivation of an R gate, the opposite effect will occur and the storage core will be driven counter clockwise through the path F—J—A.

Thus the total effect of an R gate cycle is to always leave its storage core at condition A.

*Action of W gates*

By a similar analysis, if the storage core is initially at state A in the hysteresis loop of Fig. 4*a* the activation of a W gate generates a signal which, since the W gate is oppositely connected relative to its storage core by loop 7, will apply a magnetizing current of opposite sense to that created by activation of an R gate. The storage core will thus be driven from state A in a clockwise direction through the path A—J as indicated by arrow 6*a* and will then revert to state A.

Deactivation of a W gate on the other hand will drive the core counter clockwise through the path A—D—F, the core undergoing a change of condition from state A to state F.

Similarly, if the storage core were initially at state F on the hysteresis loop, activation of a W gate will drive the core counter clockwise as indicated by arrow 6*a*, through path F—J—A and subsequent deactivation of the W gate will then drive the core from such state A counter clockwise through the path A—D—F the core undergoing a change in state from A to state F.

Thus the total effect of a W gate core upon being selectively activated and deactivated is to leave its storage core at condition F.

In this manner a storage core according to the present system can be "written" to either of the two specified conditions or magnetic states by the selective activation of an appropriate one of the gates R or W. Gate R leaves the core at state A and gate W leaves it at state F.

The material for the storage cores need not exhibit sharp saturation characteristics nor need it have a rectangular hysteresis loop. A material having the hysteresis characteristics according to Fig. 4*a* which represents the magnetic signature of the more common core material is preferably employed. The material should exhibit good remanent polarization characteristics as indicated by the fact that the points F and A cross the B-axis at large intercepts with respect to the H-axis as shown in Fig. 4*a*. Moreover, as long as saturation occurs above the $H_c$ point, the slope of the saturation line is unimportant.

The effect of the reading operation is a destructive one since it destroys the information stored in the core, always leaving it in state A. Obviously, if it is desired to reinstate the "read" information it is merely necessary to apply the output information so obtained to a logical type of "and" gate circuit to determine whether or not the W gate shall be activated following a reading (R gate) operation. Specifically, if the storage core were at condition A, and the R gate were activated and deactivated consequent to a selection process, an output pulse would be obtained upon activation of the R gate, on read line 9 and the core would be left at state A. If the core were at state F, reading with the R gate would yield no output pulse upon activation of the R gate, and would also leave the core at state A.

The existence of such two situations, namely, either the presence or absence of an output signal upon activation of the R gate consequent to a "read" operation provides an expedient for readily determining whether or not the W gating operation shall be initiated in order to reinstate the read information. That is, the absence of an output signal upon activation of the R gate as a result of the reading operation can be employed to initiate the W gate while the presence of an output signal would serve to suppress or inhibit a W gate operation.

The particular advantages obtained by the improved storage matrix may now be summarized:

(1) Because of the use of the described gating arrangement for the storage cores, the tolerances on the magnetic core material are relaxed. That is, it is unnecessary to employ materials having critical hysteresis loops of the type illustrated in Fig. 3, which type of material would normally be necessary in order that a single unit magnetizing current ($I_W$) will not produce spurious results.

(2) Because of the disclosed construction the magnetizing currents employed may be optionally made larger than any interference signal encountered.

(3) As pointed out in the description of Fig. 1, the magnitude of the bias current $I_b$ is not limited by the magnitude of the minimum coercive force ($H_c$, Fig. 3) and it is therefore feasible to employ a value of bias current which is significantly larger than the minimum necessary for operation. Hence high operational speeds are obtainable.

(4) As in conventional storage matrices, unwanted (spurious) read-out signals will be superimposed on the wanted ones due to the interaction of signals from other cores occupying the same row or column. However, in the present arrangement, such signals will have a second order effect because the outputs of the unselected gate cores will be extremely low compared to the selected gates and the non-linearity of the associated storage cores will result in the outputs of the respective unselected cores being proportionately still lower than those selected. Such characteristics further reduce interference effects.

(5) According to the present system, the storage cores are driven only by the relatively small output signals from the gate cores as compared to conventional storage systems in which selection of a core is obtainable only by directly applying magnetizing currents to the storage core. More reliable operation is thereby achieved than in the described conventional systems whenever the unselected storage core is disturbed by a magnetizing current in either the row or column winding.

Various modifications of the disclosed invention are apparent. For purposes of illustrations only two storage "clusters" have been shown in Fig. 1. However, it is to be understood that by merely extending the number of the X, R, and W selection lines employed, any desired number of such "clusters" may be provided in a particular plane. Moreover, it is obvious that the system shown in Fig. 1 may be employed together with a selection system having an access permutation greater than two as is well known. Thus, as described in an article by J. W. Forrester on pages 44–48 of the Journal of Applied Physics, vol. 22, January 1951, the number of selecting leads threading each core (the gate cores in the present case) determines energization of the particular core selected. By threading an additional winding extending along the z-cores as compared to the X and Y selection leads shown in Fig. 1 a so-called "three-dimensional" core array is achieved and the energization of three leads would be required to select a particular gate core.

The two magnetic gates driving a given storage core need not be the two adjacent ones in a group as shown in Fig. 1. A different organization could readily be employed such as for example an arrangement in which all of the "read" gates and "write" gates are mounted in separate planes respectively and the storage cores are located in a parallel plane, there between, and coupled to the gate cores by a conductive loop.

The arrangement of windings as illustrated in Fig. 1 is such as to enable the bias winding 8 to be wound in the gate cores in a manner which would reduce its inductance to the X-driving windings. The "read" winding 9 may similarly be non-inductive arranged.

The described operating cycle of the gate cores requires a sequence in which first a "read" gate and then a "write" gate is driven and restored. The arrangement is such, however, as to permit overlapping of such portions of the cycle so that the "read" gate is first driven at the beginning of the cycle, and the "write" gate is restored at the end of the cycle as long as such initial and final conditions are maintained, the intermediate restoration of the "read" gate and the driving of the "write" gate need not be distinguished. The gates may even have variable utility cycles, or operate at a variable time within the means cycle.

Therefore while there have been shown and described the fundamental features of the invention as applied to a preferred embodiment, it will be understood that various omissions and substitutions and changes in the form and details of the sense illustrated and in its operation may be made by those skilled in the art without departure from the spirit of the invention. It is the intention, therefore, to be limited only as indicated by the scope of the following claim.

What is claimed is:

In a magnetic core storage matrix including a plurality of discrete storage groups, each such storage group comprising: a storage core, a first gate core having an output winding connected to drive the storage core according to a first magnetic sense and a second gate core having an output winding connected to drive the storage core according to an opposite magnetic sense, the output windings of said first and second gates comprising a conductive loop in each storage group common to each of the gate cores and the respective storage core, means for driving each of said gate cores through a cycle of activation and deactivation to produce respective output signals therefrom, the output signals from said first gate core consequent to such cycling being effective to drive the storage core to a particular state of residual magnetization and the output signals from said second gate core consequent to such cycling being effective to drive said storage core to an opposite state of residual magnetism.

References Cited in the file of this patent

UNITED STATES PATENTS

| | | |
|---|---|---|
| 2,666,151 | Rajchman | Jan. 12, 1954 |
| 2,680,819 | Booth | June 8, 1954 |
| 2,691,155 | Rosenberg | Oct. 5, 1954 |
| 2,691,157 | Stuart-Williams | Oct. 5, 1954 |
| 2,734,182 | Rajchman | Feb. 7, 1956 |
| 2,769,925 | Saunders | Nov. 6, 1956 |
| 2,779,934 | Minnick | Jan. 29, 1957 |
| 2,781,503 | Saunders | Feb. 12, 1957 |
| 2,784,390 | Kun Li Chien | Mar. 5, 1957 |
| 2,863,135 | Saunders | Dec. 2, 1958 |
| 2,871,444 | Piety | Jan. 27, 1959 |

OTHER REFERENCES

"Static Magnetic Matrix Memory and Switching Circuits," by Rajchman, RCA Review, June 1952, pp. 183–192.

"The Use of Magnetic Cores As Switching Devices," by Minnick, Computation Laboratory, Harvard University, April 1953, pp. 2–9 through 2–12 and 2–23 through 2–30 relied upon.